April 20, 1937.  H. C. GRANT, JR  2,078,175
SUPERVISED ELECTRIC SYSTEM
Original Filed Sept. 22, 1934
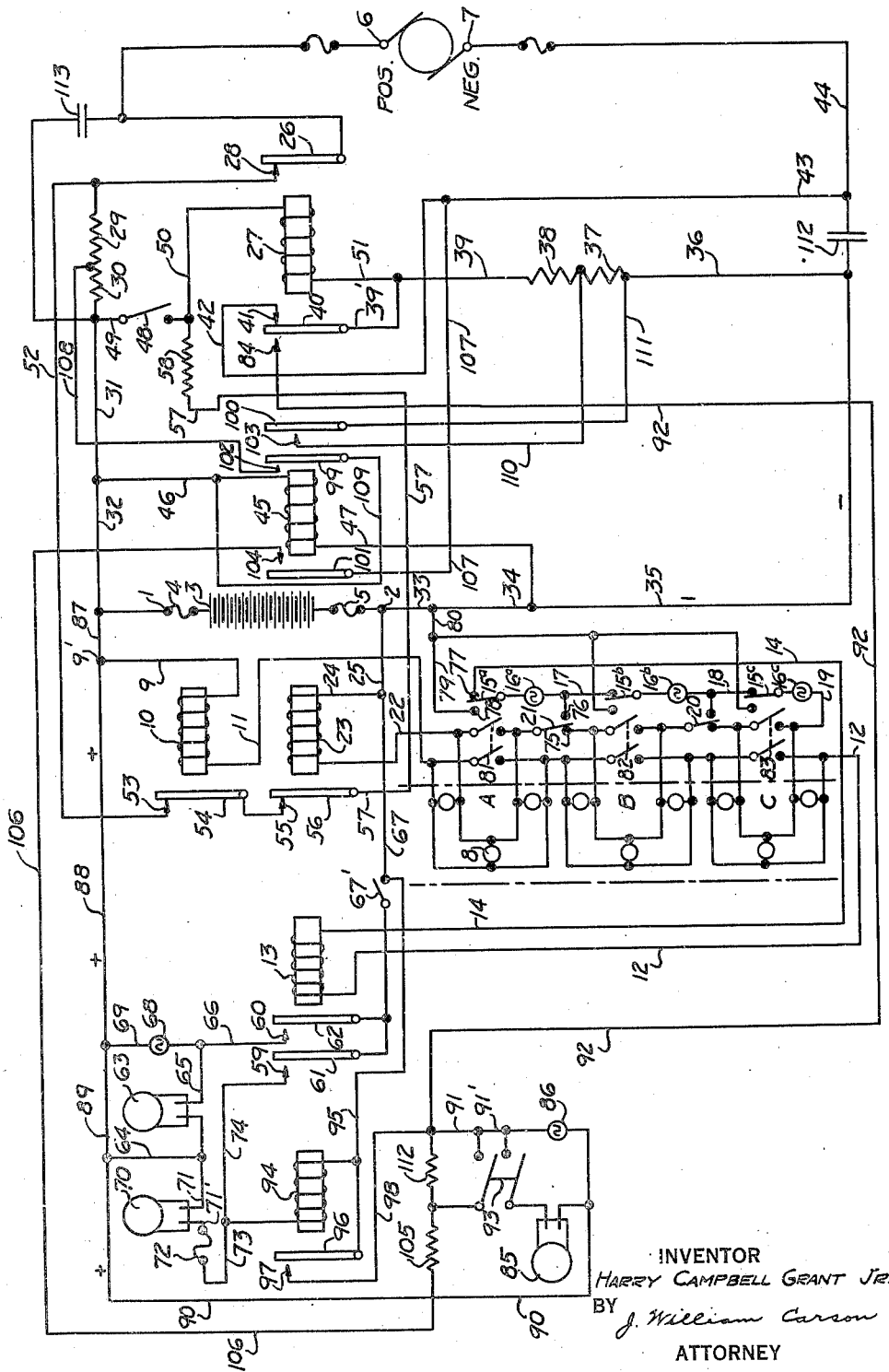
INVENTOR
HARRY CAMPBELL GRANT JR.
BY J. William Carson
ATTORNEY Patented Apr. 20, 1937

2,078,175

UNITED STATES PATENT OFFICE 2,078,175

SUPERVISED ELECTRIC SYSTEM

Harry Campbell Grant, Jr., New York, N. Y., assignor to Walter Kidde & Company, Inc., Bloomfield, N. J., a corporation of New York Original application September 22, 1934, Serial No. 745,092. Divided and this application November 16, 1935, Serial No. 50,071

4 Claims. (Cl. 177—352)

The present invention is a division of applicant's copending application Serial No. 745,092, filed September 22, 1934, for Supervised electric system, and embodies that portion of the system illustrated and described in the above copending application which relates to the method of ground protection therein described.

It is accordingly an object of the present invention to provide a method of ground protection, which is particularly adapted for use with systems of the type described in my above mentioned copending application.

It is also an object of this invention to provide a system which can be electrically energized either by a main source of electrical potential, or by a secondary source of electrical potential normally under charge from the main source, the system likewise being capable of energization simultaneously by both of the sources of potential.

In the system shown the reference numerals 1 and 2 represent the positive and negative terminals of a secondary source of electrical potential in the form of a battery 3, which is protected by fuses 4 and 5 and which is normally under charge, in a manner hereinafter to be described, from a main source of electrical energy, the positive and negative terminals of which are shown at 6 and 7.

At A there is indicated a so-called "external" circuit comprising a pair of parallel wires bridged by normally open circuit closing thermostats 8, which wires will hereinafter be known as "outer" and "inner" wires in view of their relative positions on the drawing. B and C indicate additional external circuits, all of which are connected in series in the following manner; current flowing from the positive line through the wire 9, the outer ground detecting relay 10, the wire 11, the outer wires of the external circuits A, B and C in succession, the wire 12, the fire alarm relay 13, the wire 14, the switch 15ª, the circuit lamp 16ª, the wire 17, the switch 15ᵇ, the circuit lamp 16ᵇ, the wire 18, the switch 15ᶜ, the circuit lamp 16ᶜ, the wire 19, the inner wires of the external circuits C, B and A in succession through the interposed switches 20 and 21, the wire 22, the inner ground detecting relay 23, and the wires 24 and 25 to the negative line.

The circuit just described and the battery 3 are connected in parallel with the man supply terminals 6 and 7, the latter normally supplying the energizing current for said circuit and the charging current for the battery, the positive and negative junction points being at 9' and 2.

The path of the charging current for the battery is from the main supply terminal 6 through the armature 26 of the main supply supervising relay 27, the contact 28, the charging resistances 29 and 30, the wires 31 and 32, through the battery, the wires 33, 34, 35 and 36, the charging resistances 37 and 38, the wires 39 and 39', the armature 40, the contact 41, and the wires 42, 43 and 44 to the main supply terminal 7; whereby the negative terminal of the battery is at a higher potential than the negative terminal of the main supply.

At 45 is shown the battery supervising relay which is connected to the positive terminal of the battery by wires 32 and 46, and to the negative terminal of the battery by the wires 47, 34 and 33.

When a system in accordance with the present invention has been installed and is to be made ready for use, the reset switch 48 is closed, whereupon current flows from the positive terminal of the battery through the wires 32, 31 and 49, the reset switch 48, the wire 50, the main supply supervising relay 27, the wires 51 and 39, the charging resistance 37—38, and the wires 36, 35, 34 and 33 to the negative terminal of the battery. This results in energization of the main supply supervising relay 27, causing closing of the contacts 28 and 41. Upon intentional reopening of the reset switch 48, which is therefore preferably of the push-button type, the main supply supervising relay 27 will be found to be connected across the main supply terminals 6 and 7 through the armature 26, the contact 28, the wire 52, the contact 53 of the ground detecting relay 10, the armature 54, the contact 55 of the ground detecting relay 23, the armature 56, the wire 57, the resistance 58, the wires 50, 51 and 39', the armature 40, the contact 41, and the wires 42, 43 and 44, thus holding the relay 27 energized.

By reason of the herein-referred to flow of current through the external circuits from the junction point 9' to the junction point 2, the fire alarm relay 13 is normally energized, but as soon as a fire occurs in a space protected by an external circuit, as for example in the space indicated by the normally open circuit closing thermostat 8 on the external circuit A, such thermostat will operate to bridge the parallel outer and inner wires of the external circuit A, whereby the fire alarm relay 13 will be short-circuited and de-energized. This results in the closing of the contacts 59 and 60 by the armatures 61 and 62, whereupon fire alarm signals are rendered in the following manner. The reference numeral 63 represents the fire alarm gong which is normally located at the central fire alarm station. This gong is sounded by reason of current flowing from the positive line through the wires 64, 65 and 66, the contact 60, the armature 62, and the wires 67 and 25 to the negative line, the switch 67' being a normally closed switch which will be referred to hereinafter. At the same time the fire alarm lamp 68, normally located at the central fire alarm station, is illuminated by current flowing from the positive line through the wires 69 and 66, the contact 60, the armature 62, and the wires 67 and 25 to the negative line.

In certain types of installations, for example on board ships, it is advisable to signal the presence of fire to the engine room or some other location than the central fire alarm station, which is normally in the wheelhouse or chart room of the ship. For this purpose there is provided a second fire alarm gong 70, which becomes energized by current flowing from the positive line through the wires 64 and 71, the fuse 72, the wires 73 and 74, the contact 59, the armature 61, and the wires 67 and 25 to the negative line.

As soon as the presence of fire is made known by any one or more of the means provided, the fire-watch attendant immediately proceeds to the central fire alarm station, at which point he will find on the operating panel switches 15ª, 15ᵇ, 15ᶜ, 20 and 21, all of which he is to immediately proceed to move from their normal positions on the right hand contacts (as contact 77 of switch 15ª) to their positions on the left hand contacts (as contact 78 of switch 15ª); this operation isolating the inner wires of each circuit, the outer wires being all positive in potential, the ground detecting relays both being of very low resistance.

If no fire has occurred in any of the spaces protected by the external circuit A, so that no thermostat has operated on this circuit, no indication will be given by the circuit lamp 16ª, as this lamp will lack a positive operating potential. If, however, fire has occurred in one of the spaces protected by the external circuit A, so that one of the normally open circuit closing thermostats 8 on the external circuit A has operated to bridge the parallel outer and inner wires of the external circuit A, the positive potential of the outer wire will be applied to the inner wire and then to the circuit lamp 16ª through the switch 21, which has been moved by the fire-watch attendant from the contact 75 to the contact 76; the circuit lamp 16ª being connected to negative through switch 15ª, which has been moved from contact 77 to contact 78, wire 79 and wire 80; whereby the circuit lamp 16ª will be illuminated, thus indicating the operation of a thermostat on the external circuit A and the occurrence of a fire in a space protected by the circuit.

Similar indications are given in connection with the external circuits B and C, as can be readily understood from the drawing, the corresponding switches and circuit lamps being indicated by similar reference numerals.

It has already been mentioned that the external circuits are protected against the occurrence of grounds, and the relays 10 and 23 have already been referred to as ground detector relays, these relays not being normally energized by the relatively small supervisory current which flows through the external circuits from the junction point 9' to the junction point 2, the voltage drop across each of the relays 10 and 23 being only a fraction of the total drop from the junction point 9' to the junction point 2 by reason of the far greater resistance of the fire alarm relay 13 in the same series circuit.

It is customary in ship installations to have the ship's electrical circuits ground clear but this condition rarely exists. At times the ship's negative may be grounded and shortly after this the ground may be changed from negative to positive. The relative position of the ground on a ship's generator and various points of the circuit in accordance with the present invention will cause different indications to be given at the central control station.

In order to clarify the discussions which follow, let it be assumed, by way of example, that a ship has a 220 volt supply and that the battery 3 of the present invention is a 40 volt battery.

Let it also be noted that the battery 3 is normally under charge from the main source of supply, in a manner already hereinbefore described in greater detail, through a charging resistance 29—30 in the positive lead to the battery and through a charging resistance 37—38 of substantially equal ohmic value in the negative lead to the battery, so that the potential of the negative terminal of the battery is as much higher than the potential of the negative terminal 7 of the main power supply as the potential of the positive terminal of the battery is lower than the potential of the positive terminal 6 of the main power supply.

If, therefore, any one of the outer wires of any of the external circuits becomes grounded while at the same time the positive side of the main power supply is normally grounded, a much greater than normal voltage is applied across the outer ground detector relay 10, whereupon the relay 10 is energized and the contact at 53 is opened; while if any one of the inner wires of any of the external circuits becomes grounded while at the same time the positive side of the main power supply is normally grounded, a much greater than normal voltage is applied across the inner ground detector relay 23, whereupon the relay 23 is energized and the contact at 55 is opened. The opening of either the contact 53 or the contact 55 directly interrupts the already described energizing circuit of the main supply supervising relay 27, whereupon the latter is de-energized, opening the contact at 41, and closing the contact at 84. This action results in the sounding of the trouble gong 85 and the illumination of the trouble lamp 86, by reason of current flowing from the positive terminal of the battery through the wires 87, 88, 89 and 90, then in parallel through the trouble gong 85 and the trouble lamp 86, then through the wires 91 and 92, the contact 84, the armature 40, the wires 39' and 39, the charging resistance 37—38, and the wires 36, 35, 34 and 33 to the negative terminal of the battery. The sounding of the trouble gong 85 can be stopped by opening the normally closed switch 93, but the trouble lamp will remain illuminated until the trouble has been repaired.

Similarly, if any one of the outer wires of any of the external cricuits becomes grounded while at the same time the negative side of the main power supply is normally grounded, a high current will flow through the outer ground detecting relay 10, by reason of cutting out of the circuit of the high resistance fire alarm relay 13, and the relay 10 will be energized and the contact at 53 opened. If, on the other hand, any one of the inner wires of any of the external circuits becomes grounded while at the same time the negative side of the main power supply is normally grounded, a high current will flow through the inner ground detecting relay 23, and the relay 23 will be energized and the contact at 55 opened. The reason that the relay 23 operates is that the low potential end of the relay 23 is at the same potential as the negative terminal of the battery, which latter potential is higher than the potential of the negative side of the main power supply, as already described. The opening of either the contact 53 or the contact 55 has the same effect as described in connection with positive grounds.

Although it is one of the purposes of the main supply supervising relay 27 to indicate the failure of the main supply, whereby the relay would be de-energized and the trouble signals given in the manner already explained, the most important function of the relay 27 is to break the circuit between the fire alarm system and the main supply on both sides, thus removing the ground and allowing the battery to re-energize the fire alarm relay 13, so that dangerous currents often flowing for ground conditions will be interrupted. For this reason the relay 27 is not arranged to pick up on the main supply voltage directly, but, if de-energized, is required to be reset manually by the reset switch 48, as otherwise, upon de-energization of the relay 27 due to a ground with consequent breaking of the ground circuit, the relay 27 would be re-energized and thus bring back the ground, with the result that the relay would buzz rapidly and burn off either of the contacts 28 or 41, depending on the relative location of the grounded points.

The relay 27 has also a third function, which is best mentioned at this time, in that the breaking of the circuit between the fire alarm system and the main supply upon failure of the main supply prevents the battery from discharging back into the main supply lines, the battery now serving as the main and only source of energy.

It is to be understood that the detection of grounds in accordance with the present invention depends upon normal grounding of the positive or negative of the main source of electrical supply, either directly or through a ground resistance of a ground detector arrangement such as is sometimes employed, and which consists of two lamps connected in series with each other and across the main supply, the connection between the lamps being normally grounded, so that each of the lamps is a referred to ground resistance, and whereby grounding of either line at any point gives a ground signal by causing the extinguishing of the corresponding lamp and the brightening of the lamp corresponding to the other line.

In view of the fact that the auxiliary fire alarm gong 70 is normally located at some distance from the central fire alarm station, defects can easily occur in the external leads to the auxiliary fire alarm gong, and this gong is accordingly supervised by means of the auxiliary gong supervising relay 94, current flowing from the positive line through the wire 64, the external gong lead 71, the auxiliary fire alarm gong 70, the fuse 72, the wire 73, the auxiliary gong supervising relay 94, and the wires 95, 67 and 25 to the negative line.

If now the main supply is normally grounded on the negative side, and if a ground occurs in the external gong lead 71', the auxiliary gong supervising relay 94 will be short-circuited and consequently de-energized, whereby the armature 96 will close the contact 97, and the trouble gong and trouble lamp will be operated by reason of current flowing from the positive line through the trouble gong and trouble lamp in parallel, the wires 91 and 98, the contact 97, the armature 96, and the wires 95, 67 and 25 to the negative line. At the same time the auxiliary gong 70 will sound due to the cutting out of the high resistance of the supervising relay 94. If, however, a ground occurs in the external gong lead 71, such ground will constitute a direct short-circuit across the battery 3 and one of the fuses 4 and 5 will blow out, whereupon the battery supervising relay 45 will be energized and will give the trouble signal in a manner hereinafter to be described.

If, instead of the main supply line being normally grounded on the negative side, it is normally grounded on the positive side, a ground in the external gong 71' will cause the auxiliary gong to sound by reason of the increased voltage to which it will be subjected. On the other hand, if the external gong lead 71 becomes grounded, the increased voltage on the entire system will cause the battery supervising relay 45 to be energized and the trouble signal given in a manner hereinafter to be described. At the same time the abnormally high charging current will cause one of the fuses 4 and 5 to blow, thus protecting the battery against excessive charge.

The external gong leads are not only protected against grounds in the manner already described, but likewise against direct short-circuits of the leads. Such a short-circuit is normally undetected, but as soon as a fire alarm signal is given, the short-circuit of the auxiliary gong leads constitutes a direct short-circuit of the battery, whereupon the fuse 72 or one of the battery fuses 4 and 5 will be blown out, and the battery supervising relay 45 will be energized and the trouble signal given in a manner now about to be described.

While the main supply supervising relay 27 is normally energized, the battery supervising relay 45, which is connected across the terminals of the battery 3, is not energized by the normal battery voltage, but is designed to energize upon a considerable increase in voltage across the relay winding.

It has already been explained that the external circuit between the junction points 9' and 2, and the battery 3, are connected in parallel across the main supply terminals 6 and 7, so that normally the main supply terminals provide the supervisory current flowing through the external circuit and the charging current flowing into the battery. When, however, a fire alarm or trouble alarm is given, the increased current required by the alarm gongs is greater than can be supplied by the main supply. The charging current normally flowing into the battery therefore reverses itself and the battery supplies the excess current required when alarm conditions arise.

If now the battery should fail for any reason, not only will the battery supervising relay 45 be energized and give the trouble signals, but a portion of each of the charging resistances 29—30 and 37—38 will be cut out of the main supply line, so that the main supply will be capable of supplying the increased current required when alarm conditions arise.

The battery supervising relay 45 is energized upon failure of the battery, both when the system is in its otherwise normal condition and when fire alarm or trouble alarm conditions exist. The manner in which the battery supervising relay is thus energized will be better understood if it is kept in mind that the voltage across the relay winding is normally the same as the voltage across the battery and across the external circuit between the junctions 9' and 2. In the system herein described, the resistance of the external circuit is considerably greater than the internal resistance of the battery, and is also somewhat greater than the combined values of the charging resistances 29—30 and 37—38. It also happens that in the system described the internal resistance of the battery is less than the combined values of the charging resistances 29—30 and 37—38. When, therefore, the battery fails for any reason with the substitution of practically infinite resistance in place of the normally small internal resistance of the battery, a considerably increased voltage drop will occur across the external circuit, due to the fact that removal of the battery charging current load will reduce the voltage drop across the charging resistance 29—30, and this increased voltage, occurring likewise across the winding of the relay 45, will cause the relay to pick up its armatures 99, 100 and 101 and close the contacts at 102, 103 and 104. The trouble signals will then be given by reason of current flowing from the positive line through the trouble gong and trouble lamp in parallel, the wire 91', one side of the switch 93, the resistance 105, the wire 106, the contact 104, the armature 101, and the wires 107, 43 and 44 to the main supply terminal 7. Instead, however, of the connections from the main supply terminals 6 and 7 being through the charging resistances 29—30 and 37—38, the increased current which the main supply is called upon to supply when the fire or trouble gongs are sounded, requires that part of the charging resistances be by-passed, and it will accordingly be found that the portion 30 of the charging resistance 29—30 is shirt-circuited by closing of the contact 102, the path of the short-circuit being from one side of the resistance 30 through the wire 108, the contact 102, the armature 99, and the wires 109, 46 and 31 to the other side of the resistance 30. Similarly, the portion 37 of the charging resistance 37—38 is short-circuited by closing of the contact 103, the path of the short-circuit being from one side of the resistance 37 through the wire 110, the contact 103, the armature 100, and the wire 111 to the other side of the resistance 37. If now the trouble gong be stopped by opening the switch 93, additional resistance must be drawn into the circuit to protect the trouble lamp 83, and this additional resistance will be found at 112, so that the trouble lamp is energized in a series circuit including the resistances 105 and 112.

It must of course be understood that the main supply now furnishes current at an increased voltage across the entire fire alarm system. Consequently, the ground detector relays 10 and 23 must be so designed with respect to the fire alarm relay 13 that, except when grounds occur in the external circuits, the voltage drop across the relays 10 and 23 is only a fraction of the voltage drop between the junction points 9' and 2. If this feature is not provided for, failure of the battery with resultant increased voltage on the fire alarm system, as already described, would cause energization of the ground detector relays 10 and 23 and de-energization of the main supply supervising relay 27, with consequent cutting off of the main supply. This would mean that the system would be absolutely dead and inoperative and would give neither fire nor trouble signals.

From the foregoing description it will be apparent that I have made various improvements in supervised electric systems of the general type referred to, but while the invention has been described with specific reference to the accompanying drawing, it is not to be understood as limited, save as defined in the appended claims.

I claim:

1. A supervised electric system comprising a plurality of external circuits, a source of electric potential, at least one pole of which may be normally grounded, for normally energizing said external circuits, a secondary source of electric potential for energizing said external circuits, in the event of failure of the first named source, normally under charge from the first named source, an electromagnet, an alarm signal, means to control the alarm signal by the electromagnet, a pair of ground detecting relays; means to connect certain of the aforesaid elements in a series circuit comprising in the following order one of the ground detecting relays, at least one external circuit, said electromagnet, at least one other external circuit, the other ground detecting relay and the first named source of electric potential; a main supply relay, two normally closed pairs of contacts controlled by said main supply relay, a normally closed pair of contacts controlled by each ground detecting relay, said main supply relay being normally energized by reason of connection from one of the poles of the first named source of electric potential, through one of the pairs of contacts of the main supply relay, in series through the pairs of contacts controlled by the ground detecting relays, through the main supply relay, through the second pair of contacts of the main supply relay to the other pole of the first named source of electric potential, said secondary source of electric potential being connected to said first named source through said pairs of contacts of the main supply relay, and said series circuit through the ground detecting relays including said pairs of contacts of the main supply relay; whereby the occurrence of a ground in any one of the external circuits while one of the poles of the first named source of electric potential is grounded will actuate either one or the other of the ground detecting relays to open the normally closed pair of contacts controlled thereby, causing deenergization of the main supply relay and consequent disconnection of the electric system from both poles of the first named source of electric potential together with disconnection from the normally existing ground, at the same time permitting the entire electric system to function from the secondary source of electric potential despite the disconnection of the first named source of electric potential and the existence of the accidental ground.

2. A supervised electric system comprising a plurality of external circuits, a source of electric potential, at least one pole of which may be normally grounded, for normally energizing said external circuits, a secondary source of electric potential for energizing said external circuits, in the event of failure of the first named source, normally under charge from the first named source through charging resistances in the positive and negative leads from the first named source, so that the relative potential of the negative terminal of the secondary source is higher than the potential of the negative terminal of the first named source, an electromagnet, an alarm signal, means to control the alarm signal by the electromagnet, a pair of ground detecting relays; means to connect certain of the aforesaid elements in a series circuit comprising in the following order a charging resistance, one of the ground detecting relays, at least one external circuit, said electromagnet, at least one other external circuit, the other ground detecting relay, another charging resistance, and the first named source of electric potential; and means controlled by the ground detecting relays upon the occurrence of a ground in any one of the external circuits while one of the poles of the first named source is grounded to effect disconnection of the electric system from both poles of the first named source of electric potential together with disconnection from the normally existing ground, at the same time permitting the entire system to function from the secondary source of electric potential despite the disconnection of the first named source of electric potential and the existence of the accidental ground.

3. A supervised electric system comprising a plurality of external circuits, a source of electric potential, at least one pole of which may be normally grounded, for normally energizing said external circuits, an electromagnet, an alarm signal, means to control the alarm signal by the electromagnet; a pair of ground detecting relays; means to connect certain of the aforesaid elements in a series circuit comprising in the following order one of the ground detecting relays, at least one external circuit, said electromagnet, at least one other external circuit, the other ground detecting relay, and the source of electric potential; a main supply relay, two normally closed pairs of contacts controlled by said main supply relay, a normally closed pair of contacts controlled by each ground detecting relay, said main supply relay being normally energized by reason of connection from one of the poles of the source of electric potential, through one of the pairs of contacts of the main supply relay, in series through the pairs of contacts controlled by the ground detecting relays, through the main supply relay, through the second pair of contacts of the main supply relay to the other pole of the source of electric potential, said series circuit through the ground detecting relays including said pairs of contacts of the main supply relay, whereby the occurrence of a ground in any one of the external circuits while one of the poles of the source of electric potential is grounded will actuate either one or the other of the ground detecting relays to open the normally closed pair of contacts controlled thereby, causing deenergization of the main supply relay and consequent disconnection of the electric system from both poles of the source of electric potential together with disconnection from the normally existing ground.

4. In an electric system comprising a plurality of external circuits, a source of electric potential, at least one pole of which may be normally grounded, for normally energizing said external circuits, an electromagnet, an alarm signal, means to control the alarm signal by the electromagnet, and means to connect certain of the aforesaid elements in a series circuit comprising at least one external circuit, said electromagnet, at least one other external circuit, and the source of electric potential; the provision of means for protecting the electric system against the occurrence of grounds in an external circuit, comprising a relatively high resistance inserted at each end of the series circuit adjacent its point of electrical connection with the source of electric potential, each said resistance consisting, in part at least, in a ground detecting relay, said resistances serving to limit currents flowing when a ground occurs in an external circuit, and means controlled by the operation of said ground detecting relays to disconnect the electric system from the source upon the occurrence of a ground in an external circuit at the same time that one of the poles of the source is grounded.

HARRY CAMPBELL GRANT, Jr.